Patented June 3, 1930

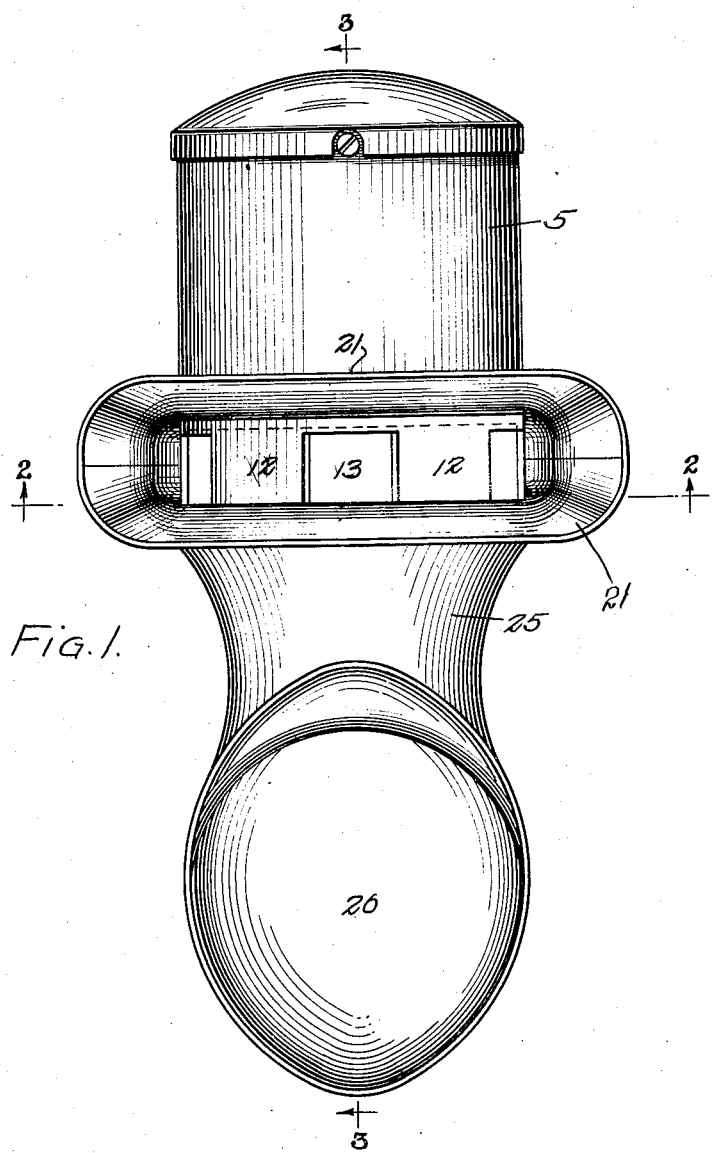

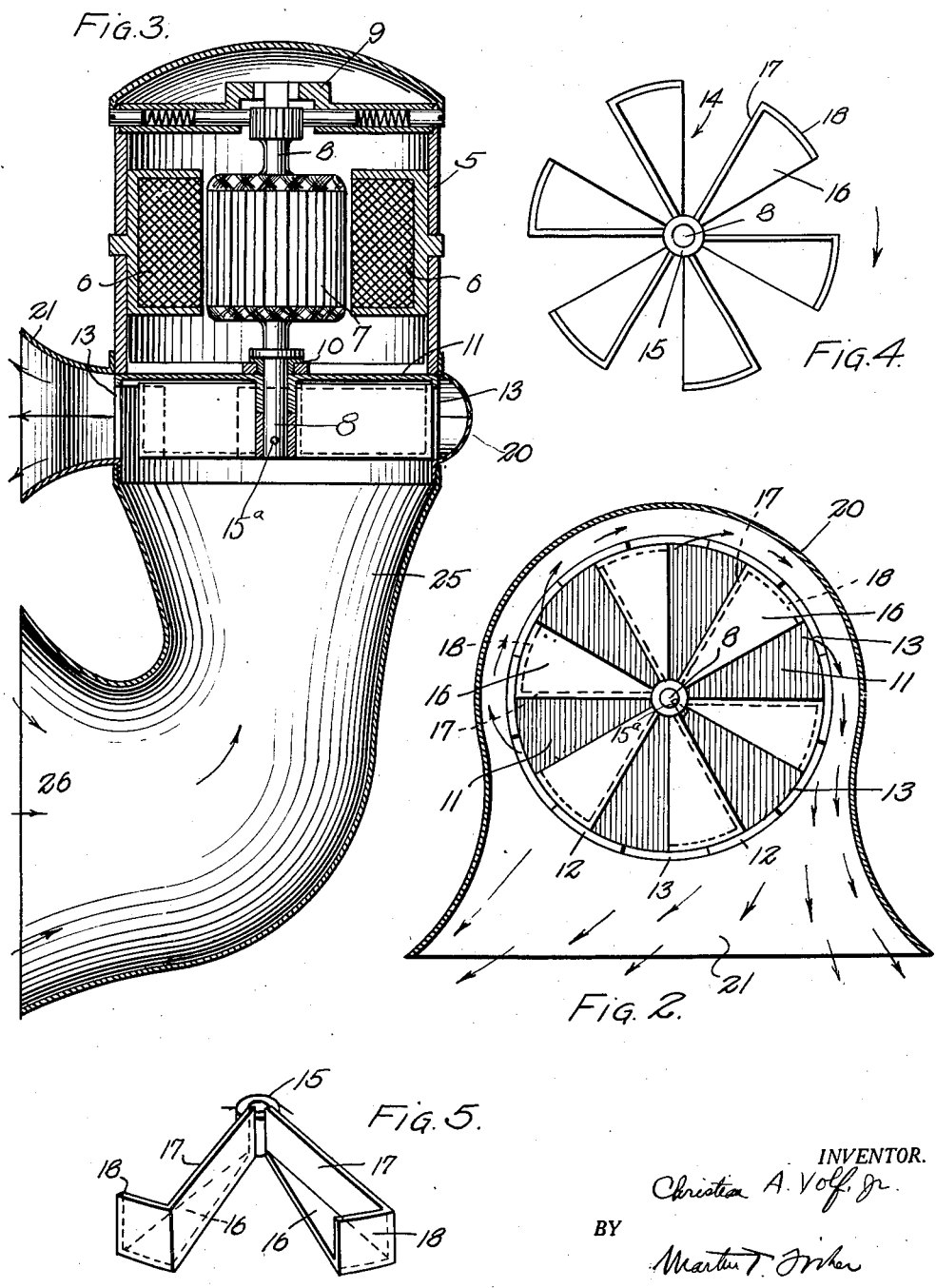

1,761,162

UNITED STATES PATENT OFFICE

CHRISTIAN A. VOLF, JR., OF BROOKLYN, NEW YORK

VEHICLE SIREN

Application filed June 30, 1928. Serial No. 289,466.

This invention is a motor driven siren primarily designed for use on a vehicle, although capable of use in other situations.

One of the important features of the invention is that the siren is so designed that it has an air intake horn and a sound directing horn, both facing in the direction of travel of the vehicle. This novel arrangement is attained by providing a vertically disposed casing, in the upper part of which is a motor, in the intermediate part of which is the shutter and sound directing horn, and in the lower part of which is the air intake horn.

In certain sirens in the prior art, for use on such vehicles as fire apparatus and ambulances, the sound is directed usually downwardly and then radially so that the sound spreads in all directions. The sound spreading to either side and spreading to the rear is rather useless since clearly the important thing in a vehicle siren is to direct a powerful blast forwardly as far as possible so as to clear traffic for the vehicle, it being of practically no consequence whether the sound is directed laterally or backwardly. With the siren of this invention, a maximum amount of sound for a given motor installation is directed forwardly in the direction of travel of the vehicle, very little sound being spread laterally or backwardly.

The air intake horn, which is preferably located in the lower part of the casing, also faces forwardly, which is of importance in that it utilizes the forward travel of the vehicle in creating additional air pressure for feeding a large amount of air to the rotating shutter.

Another important feature of the invention is that the air taken in by the intake horn then passes vertically upwardly striking against the shutter and exerting on the shutter a lifting effect, which lifting effect is in turn transmitted to the motor shaft which carries the shutter, thereby in effect floating the motor shaft, and relieving the bearings of most of the weight of the motor shaft, thereby lessening the friction on the bearings and increasing their life, as well as making it considerably easier to drive the shaft, enabling the use of a smaller motor for a given electrical power and giving more power to the sound blasts.

One of the features of the siren is a rotating shutter, which is provided with scoop like blades for picking up the air and driving it rapidly through the shutter and out of the sound directing horn.

Other improved details of structure and operation will be apparent from the accompanying drawings, in which:

Figure 1 is a front view;

Figure 2 is a section on the line 2—2 of Figure 1, looking in the direction of the arrows;

Figure 3 is a section on the line 3—3 of Figure 1;

Figure 4 is a top view of the rotating shutter, and

Figure 5 is a perspective view of part of the shutter.

Referring now to the drawings in which similar reference characters indicate similar parts, the siren comprises a vertically disposed casing in the upper part 5 of which there is an electric motor, illustrated more or less diagrammatically, comprising the field pieces 6, armature 7 mounted on a vertically disposed shaft 8, turning in an upper bearing 9 and a lower bearing 10. The bearings are shown diagrammatically. Ball bearings could be used if desired. The motor chamber is partitioned off by a bottom plate 11 suitably secured to the lower edge of the casing 5. This bottom plate 11 is provided with an outer circumferentially extending vertically disposed apertured wall 12, the apertures of which are indicated by 13. These apertures 13 are for the escape of air, as will be apparent as the description proceeds. The partition wall 7 and the circumferential wall 12 define a sound producing chamber in which the sound producing shutter rotates. The shutter, (referring more particularly to Figures 4 and 5), comprises a plurality of blades 14 secured to a hub 15 with a set screw 15ª which thereby rotate with the motor shaft 8. Each shutter blade comprises a bottom wall 16, a substantially rectangular radially extending side wall 17 and a vertically disposed substantially rectangular end wall or lip 18. The bottom walls or segments 16 are substantially horizontal and are lifted by the up-rushing air, whereby a lift is exerted on the motor shaft. The segments 16 need not be strictly horizontal; they could be inclined and still give the desired lifting effect. That part of the shutter opposite the wall 17 is entirely blank so as to form in effect a scoop, from which it will be clear that as the shutter rotates in the direction of the arrow, air will be picked up by the blades, and will be driven out through the air exit openings 13, the escape of air being interrupted by the depending walls 12, which would produce air vibrations or sound waves, the pitch of which would, of course, depend on the speed of the rotating shutter.

At an intermediate part of the casing, and surrounding the air exit openings 13 on substantially three sides, is a sound collecting chamber 20 which is more or less U-shaped as shown in Figure 2, and which at one side is flared outwardly as shown at 21, to form a sound directing horn, which faces in the direction of travel of the vehicle, and directs practically all of the sound in the direction of travel of the vehicle, without allowing any substantial amount to escape laterally or rearwardly. This is an important feature of the invention, as clearly the important thing in a vehicle siren is to concentrate the sound forwardly of the vehicle and to produce a blast that will travel the maximum distance forwardly of the vehicle. As shown in Fig. 2, the air waves pass around inside the sound chamber 20 in a clockwise direction, being meanwhile amplified, and then projected outwardly and forwardly, as shown by the arrows.

Below the rotating shutter there is an air intake horn 25 which extends vertically downwardly and is then bent laterally to form an air intake mouth 26 which flares outwardly and opens in the same direction as the sound directing horn 21, that is to say, it opens forwardly in the direction of travel of the vehicle, whereby the forward motion of the vehicle creates a certain air pressure which aids the horn in scooping up a maximum amount of air for feeding it to the rotating shutter.

The air comes in the intake 26, travels forwardly and then upwardly; the upwardly moving air hits against the underside of the bottom walls 16 of the rotating shutter and exerts on these walls a vertical lift due to the fact that the air is travelling vertically. Since the shutter is carried on the lower end of the shaft, this vertical lift is transmitted to the shaft and serves to lift it, thereby in effect floating the shaft and relieving the bearings of more or less of the weight of the shaft, which would lengthen the life of the bearings and would enable a greater amount of power from motor to be utilized in using sound waves, rather than in overcoming friction that would exist in the bearing if the motor shaft were not thus floated.

While I have illustrated my invention in some detail, it should be understood that it could be carried out in other ways as falling within the scope of the appended claims.

I claim as my invention:

1. A siren, comprising in combination a vertically disposed casing, a motor in the upper part of the casing, an air intake in the lower part of the casing, and a sounding horn at an intermediate part of the casing, on a different level from the air intake.

2. A siren, comprising in combination a vertically disposed casing, a motor in the upper part of the casing, an air intake in the lower part of the casing, and a sounding horn at an intermediate part of the casing, the air intake and the sounding horn facing in the same direction, and being on different levels.

3. A siren, comprising in combination a vertically disposed casing, a motor in the upper part of the casing, an air intake in the lower part of the casing, a sounding horn, for directing the sound in a given direction, at an intermediate part of the casing, the air intake and the sounding horn being on different levels, a shaft driven by and depending from the motor, and shutter means, adjacent said sounding horn, rotatably driven by said motor shaft.

4. A siren, comprising in combination a vertically disposed casing, a motor in the upper part of the casing, an air intake in the lower part of the casing, a sounding horn, for directing the sound in a given direction, at an intermediate part of the casing, a shaft driven by and depending from the motor, and shutter means, adjacent said sounding horn, rotatably driven by said motor shaft, the air intake and the sounding horn facing in the same direction.

5. A siren, comprising in combination a vertically disposed casing, a motor, having a depending shaft, in the upper part of the casing, a rotating shutter at about the middle of the casing driven by the motor shaft, partition means just below the motor, shutting it off from the air passing through the siren and an air intake horn at the lower part of the casing, the air travelling rapidly upwardly from the intake exerting a lifting effect on the rotating shutter and motor shaft.

6. A siren, comprising in combination a vertically disposed casing, a motor, having a depending shaft, in the upper part of the casing, a rotating shutter at about the middle of the casing driven by the motor shaft, the shutter having blades with substantially horizontally disposed segments, a sounding horn, for directing the sound from the shutter in a forward direction, adjacent the shutter, and an air intake horn at the lower part of the casing, the air travelling rapidly upwardly from the intake exerting a lifting effect on the horizontal segments of the rotating shutter and so on the motor shaft.

7. A siren, comprising in combination a vertically disposed casing, a motor, having a depending shaft, in the upper part of the casing, a rotating shutter at about the middle of the casing driven by the motor shaft, the shutter having blades with substantially horizontally disposed segments, a sounding horn, for directing the sound from the shutter in a forward direction, adjacent the shutter, and an air intake horn at the lower part of the casing, the air intake horn and the sounding horn facing in the same direction, the air travelling rapidly upwardly from the intake exerting a lifting effect on the horizontal segments of the rotating shutter and so on the motor shaft.

8. A motor driven siren for a vehicle comprising in combination, a vertically disposed casing, a motor, an air intake horn, a sound directing horn, said horns being at different levels rotating shutter means adjacent the sound directing horn and driven by the motor, the sound directing horn facing in the direction of travel of the vehicle, and partition means between the motor and the other parts of the siren shutting it off from contact with the air passing through the siren.

9. A motor driven siren for a vehicle comprising in combination a vertically disposed casing, a motor, an air intake horn, a sound directing horn, and rotating shutter means adjacent the sound directing horn and driven by the motor, the sound directing horn and the air intake horn facing in the direction of travel of the vehicle.

10. A motor driven siren for a vehicle comprising in combination a vertically disposed casing, a motor in the upper part of the casing, a rotating shutter driven by the motor, at the intermediate part of the casing, a sound directing horn around said shutter, facing in the direction of travel of the vehicle, and an air intake horn at the lower part of the casing.

11. A motor driven siren for a vehicle comprising in combination a vertically disposed casing, a motor in the upper part of the casing, a rotating shutter driven by the motor, at the intermediate part of the casing, a sound directing horn around said shutter, facing in the direction of travel of the vehicle, and an air intake horn at the lower part of the casing, and facing in the direction of travel of the vehicle.

12. A motor driven siren for a vehicle comprising in combination a vertically disposed casing, a motor in the upper part of the casing, having a depending shaft, a rotating shutter carried by the lower part of the shaft, a sound directing horn on the same level with the shutter, and facing in the direction of travel of the vehicle, and an air intake horn at the lower part of the casing, for taking in air and feeding it upwardly to the shutter, whereby both of said horns are on the same side of the motor and the air passing through the siren does not contact with the motor.

13. In a siren, the combination with a fixed circumferential wall provided with spaced apertures, of a rotatable shutter mounted to rotate within the space inside the wall, the shutter having a plurality of radially disposed blades each of which has a back wall and an arcuate end wall, producing a scoop effect which picks up the air and drives it out through said apertures, an air intake horn for feeding air to the shutter and a sound directing horn at the level of the shutter and partially surrounding said apertures.

14. In a siren, the combination with a fixed circumferential wall provided with spaced apertures, of a rotatable shutter mounted to rotate within the space inside the wall, the shutter having a plurality of radially disposed blades each of which has a back wall, a bottom wall, and an arcuate end wall, producing a scoop effect which picks up the air and drives it out through said apertures, an air intake horn for feeding air to the shutter and a sound directing horn at the level of the shutter and partially surrounding said apertures.

15. In a siren, the combination with a rotating shutter, of a circumferentially extending wall member around the shutter, said wall member being provided with apertures for the escape of air, and a sound collecting member partially surrounding the wall member and provided with a sound directing horn for collecting the sound waves and directing them out through the horn.

16. In a siren, the combination with a rotating shutter, of a circumferentially extending wall member around the shutter, said wall member being provided with apertures for the escape of air, a sound collecting member partially surrounding the wall member and provided with a sound directing horn for collecting the sound waves and directing them out through the horn, and an air intake horn having an air intake mouth facing in the same direction as the sound directing horn.

17. In a siren, the combination with a vertically disposed casing, a motor in the upper part of the casing, having a shaft extending below it, a rotating shutter carried by the lower part of the motor shaft, a circumferentially extending wall member around the shutter, said wall member being provided with apertures for the escape of air, and a sound collecting member, provided with a sound directing horn, partially surrounding the wall member for collecting the sound waves and directing them out through the sound directing horn.

18. In a siren, the combination with a vertically disposed casing, a motor in the upper part of the casing, having a shaft extending below it, a rotating shutter carried by the lower part of the motor shaft, a circumferentially extending wall member around the shutter, said wall member being provided with apertures for the escape of air, a sound collecting member, provided with a sound directing horn, partially surrounding the wall member for collecting the sound waves and directing them out through the sound directing horn, and an air intake horn for feeding air from below up to the rotating shutter.

19. In a siren, the combination with a vertically disposed casing, a motor in the upper part of the casing, having a shaft extending below it, a rotating shutter carried by the lower part of the motor shaft, a circumferentially extending wall member around the shutter, said wall member being provided with apertures for the escape of air, a sound collecting member, provided with a sound directing horn, partially surrounding the wall member for collecting the sound waves and directing them out through the sound directing horn, and an air intake horn at the lower part of the casing, having an air intake mouth facing in the same direction as the sound directing horn, for supplying air to the shutter.

In testimony whereof I affix my signature.

CHRISTIAN A. VOLF, Jr.